United States Patent
Srinivasan

(10) Patent No.: US 7,047,210 B1
(45) Date of Patent: May 16, 2006

(54) METHOD AND SYSTEM FOR AUCTIONING A PRODUCT ON A COMPUTER NETWORK

(75) Inventor: Thiru Srinivasan, Highlands Ranch, CO (US)

(73) Assignee: Qwest Communications International Inc., Denver, CO (US)

( * ) Notice: Subject to any disclaimer, the term of this patent is extended or adjusted under 35 U.S.C. 154(b) by 716 days.

(21) Appl. No.: 09/471,696

(22) Filed: Dec. 23, 1999

(51) Int. Cl.
G06Q 30/00 (2006.01)
G06Q 99/00 (2006.01)

(52) U.S. Cl. .............................. 705/26; 705/1; 705/37
(58) Field of Classification Search .................... 705/5, 705/6, 7, 9, 28, 37, 22, 26, 1
See application file for complete search history.

(56) References Cited

U.S. PATENT DOCUMENTS

| | | | |
|---|---|---|---|
| 5,835,896 A | 11/1998 | Fisher et al. | |
| 5,890,138 A | 3/1999 | Godin et al. | |
| 5,897,620 A | 4/1999 | Walker et al. | |
| 5,978,768 A * | 11/1999 | McGovern et al. | ............ 705/1 |

FOREIGN PATENT DOCUMENTS

WO    WO 200116765 A1 *  3/2001

OTHER PUBLICATIONS www.biddersedge.com, posted on Dec. 12, 1998 (found using www.archive.org).*
www.monster.com, available on the web and archived by www.archive.com on Dec. 12, 1998.*
Microsoft Computer Dictionary, Microsoft Press, 1994, Second Edition, p. 143.*

* cited by examiner

Primary Examiner—James A Kramer
(74) Attorney, Agent, or Firm—Brooks Kushman P.C.

(57) ABSTRACT

A method and system for auctioning a product on a computer network includes an auction site computer having an auction site and a scan site computer having a scan site. The method and system includes placing a desired product identifier on the scan site of the computer network. The desired product identifier is indicative of a product desired by the buyer. The auction site has a sale product identifier indicative of a product for sale by a seller. The auction site is then monitored with the scan site. The desired product identifier on the scan site is then compared with the sale product identifier on the auction site. Whether the product desired by the buyer is for sale on the auction site by the seller is then determined from the comparison between the desired product identifier and the sale product identifier. The buyer is then notified when the product desired by the buyer is for sale on the auction site by the seller. A bid from the buyer is then placed to the auction site for the product desired by the buyer. The scan site may be monitored to determine the product desired by the buyer. Each of the product identifiers may include a category product and/or a description product identifier. Comparing the desired product identifier with the sale product identifier includes comparing the category product identifier on the scan site with the category product identifier on the auction site and/or comparing the description product identifier on the scan site with the description product identifier on the auction site. The auction site may be monitored with the scan site using electronic data interchange (EDI) messaging.

17 Claims, 10 Drawing Sheets

Create Buyer Profile Created

Buyer Profile Successfully Created.

Buyer Login

56

Login ID*:

Password*:

SUBMIT  58

CANCEL

* Means Field Is Required.

FIG. 3D

VIEW ITEMS

| Buyer Item # | Category | Make | Model | Version ISBN | Year | Quantity | Description |
|---|---|---|---|---|---|---|---|
| | | | | | | | |
| | | | | | | | |
| | | | | | | | |
| | | | | | | | |
| | | | | | | | |
| | | | | | | | |

[ADD ITEM] [CHANGE ITEM] [DELETE ITEM] [CANCEL]

FIG. 3G

ADD ITEM

Antiques
    General
    Ancient World
    Books, Manuscripts
    Folk Art
    Metalware
    Musical Instruments
    Prints
    Science Instruments
    Textiles, Linens
    Antiques (post-1900)

Books, Movies, Music
    Books
    Magazines
    Music
    Movies

[CANCEL]

FIG. 3H

ADD ITEM - Computer

Make: COMPAQ

Model: DESKPRO 590

Description: Pentium 90 MHz, 16 Meg. And Monitor

Date Until You Will Wait For The Merchandise: 5/10/99
(Not More Than 30 Days)

[ADD]    [CANCEL]

ADD ITEM - Barber Shop

Description: BENGALL Straight Razor W/ Handle

Date Until You Will Wait For The Merchandise: 5/25/99
(Not More Than 30 Days)

[ADD]    [CANCEL]

AUCTION ITEM - Computers

| | | | |
|---|---|---|---|
| Seller ID: | jdoe1 | Buyer Item #s: | |
| Make: | COMPAQ | | |
| Model: | DESKPRO 590 | Quantity Auctioned: | 1 |
| Description: | Pentium 90 MHz, 16 Meg, And Monitor | | |
| Starting Price: | $120 | | |
| Bid Ends On: | 4/13/99 16:00 | | |

Filename Containing Picture Of The Merchandise: [          ]  Browse...

Select The Auction Sites You Want The Item To Be Listed:
- www.ebay.com
- www.onsale.com
- www.ubid.com
- www.uswest.com

ADD          CANCEL

FIG. 3M

Wanted To Buy Table: ⟵92

| Buyer Login ID | Buyer Item # | Category | Make | Model | Year | Quantity | Version /ISBN | Description | Selling Web Site | Match Found (Y/N) | Ad Placed In Selling Web Site (Y/N) |
|---|---|---|---|---|---|---|---|---|---|---|---|
| | | | | | | | | | | | |
| | | | | | | | | | | | |
| | | | | | | | | | | | |
| | | | | | | | | | | | |

FIG. 4A

Merchandise Auctioned Table: ⟵94

| Seller ID | Sell Or Item # | Category | Make | Model | Year | Version /ISBN | Picture | Bid Starts At $ | End Data | No. Of Bids | Quantity | Description |
|---|---|---|---|---|---|---|---|---|---|---|---|---|
| | | | | | | | | | | | | |
| | | | | | | | | | | | | |
| | | | | | | | | | | | | |
| | | | | | | | | | | | | |

METHOD AND SYSTEM FOR AUCTIONING A PRODUCT ON A COMPUTER NETWORK

TECHNICAL FIELD

The present invention relates generally to computer auctioning methods and systems and, more particularly, to an auctioning method and system for a computer network having a scan site and an auction site in which the scan site monitors the auction site and compares a list of desired products to the products being sold on the auction site to determine if a desired product is being sold.

BACKGROUND ART

In typical Internet based auctions, sellers place their merchandise for sale. Buyers bid for the items to be auctioned. On the closing date, the auctioneer determines the winning buyer with the highest bid and informs the winning buyer of same. The auctioneer may then act as a clearinghouse thereafter to transfer the merchandise to the winning buyer in exchange for the bid.

Buyers generally have an idea or a list of items that they would be interested in purchasing through an auction. A disadvantage associated with typical Internet based auctions is that the buyers do not know when and which Internet auctions sites have the desired merchandise available for auction. So the buyers have to periodically watch for the different Internet auction sites, almost on a daily basis, for the desired merchandise to determine when the desired merchandise becomes available for auctioning.

Another disadvantage associated with typical Internet based auctions is that they are supply driven and have no regard to the demand side of the equation. Further, with typical Internet based auctions, sellers do not, at least initially, know the kind of demand for merchandise that they would like to sell. Sellers would place more merchandise for sale if they knew that demand for the merchandise indicated that the sellers are likely to obtain a higher value by selling the merchandise through an auction than the value of holding onto the merchandise.

What is needed is a method and system for Internet based auctions in which the basic principles of supply and demand are followed more accurately than existing Internet based auctions.

SUMMARY OF THE INVENTION

Accordingly, it is an object of the present invention to provide an auctioning method and system for a computer network having a scan site and an auction site in which the scan site monitors the auction site and compares a list of desired products to the products being sold on the auction site to determine if a desired product is being sold.

It is another object of the present invention to provide an auctioning method and system for a computer network having a scan site and auction sites in which the scan site monitors the auction sites and compares a list of desired products to the products being sold on the auction sites and then indicates which auction sites are selling the desired products.

It is a further object of the present invention to provide an auctioning method and system for a computer network provided with a scan site having a list of desired products to be purchased by buyers in which sellers monitor the scan site to determine which products are desired to be purchased by buyers.

In carrying out the above objects and other objects, the present invention provides a method of auctioning a product on a computer network having an auction site and a scan site. The auction site has a sale product identifier indicative of a product for sale by a seller. The method includes placing a desired product identifier on the scan site of the computer network. The desired product identifier is indicative of a product desired by the buyer. The auction site is then monitored with the scan site. The desired product identifier on the scan site is then compared with the sale product identifier on the auction site. Whether the product desired by the buyer is for sale on the auction site by the seller is then determined from the comparison between the desired product identifier and the sale product identifier.

The buyer is then notified when the product desired by the buyer is for sale on the auction site by the seller. A bid from the buyer is then placed to the auction site for the product desired by the buyer. The scan site may be monitored to determine the product desired by the buyer.

Preferably, each of the product identifiers includes a category product and/or a description product identifier. The step of comparing the desired product identifier with the sale product identifier includes comparing the category product identifier on the scan site with the category product identifier on the auction site and/or comparing the description product identifier on the scan site with the description product identifier on the auction site. Preferably, the auction site is monitored with the scan site using electronic data interchange (EDI) messaging.

Further, in carrying out the above objects and other objects, the present invention provides a computer network auctioning system including an auction host computer and a scan site computer. The auction host computer has an auction site. The auction site has a sale product identifier indicative of a product for sale by a seller. The scan host computer has a scan site. The scan host computer is operable for placing a desired product identifier on the scan site of the computer network. The desired product identifier is indicative of a product desired by a buyer. The scan host computer is operable to monitor the auction site, compare the desired product identifier on the scan site with the sale product identifier on the auction site, and determine from the comparison between the desired product identifier and the sale product identifier whether the product desired by the buyer is for sale on the auction site by the seller.

The above objects and other objects, features, and advantages of the present invention will be apparent from the following detailed description of the best mode for carrying out the invention when taken in connection with the accompanying drawings.

BRIEF DESCRIPTION OF DRAWINGS

FIGS. 3A through 3M illustrate details of an implementation of the auctioning method and system through graphical user interfaces; and FIGS. 4A through 4D illustrate the database layouts maintained by the auctioning method and system.

BEST MODE FOR CARRYING OUT THE INVENTION

Figure 1:
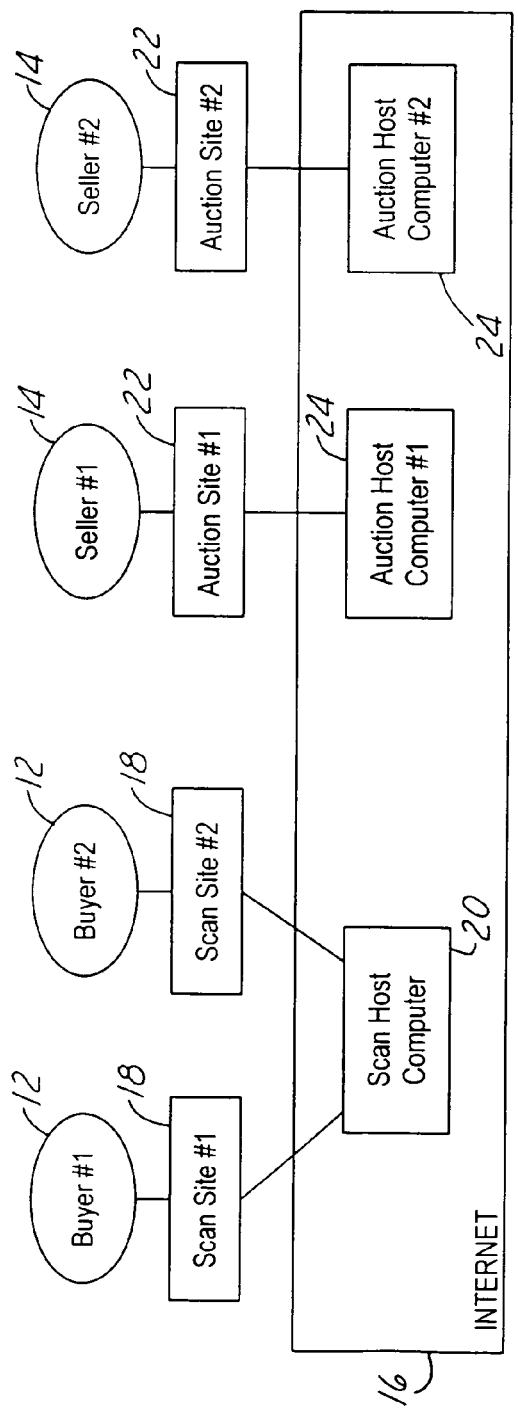
FIG. 1 illustrates a block diagram of a computer network auctioning system in accordance with carrying out the method of the present invention.

Referring now to FIG. 1, a block diagram of a computer network auctioning system 10 for carrying out the method of the present invention is shown. System 10 serves a plurality of buyers 12 and sellers 14. Each of buyers 12 and sellers 14 has a computer terminal with the appropriate browser software for accessing computer network 16. Computer network 16 is preferably the Internet. Each of buyers 12 is associated with a scan site 18. Buyers 12 use their computer terminals to enter descriptions of items or products that they would be interested in buying in their respective scan sites 18. Scan sites 18 are then entered into a scan host computer 20. There may be multiple scan host computers. Scan host computer 20 is part of an Internet server system.

Each of sellers 14 is associated with an auction site 22. Sellers 14 use their computer terminals to enter descriptions of items or products that they will auction in their respective auction sites 22. Auction sites 22 are then entered into respective auction host computers 24. Auction host computers 24 are part of an Internet server system and are operable to exchange data with scan host computer 20. Preferably, scan host computer 20 and auction host computers 24 exchange data using electronic data interchange (EDI) messaging.

Figure 2:
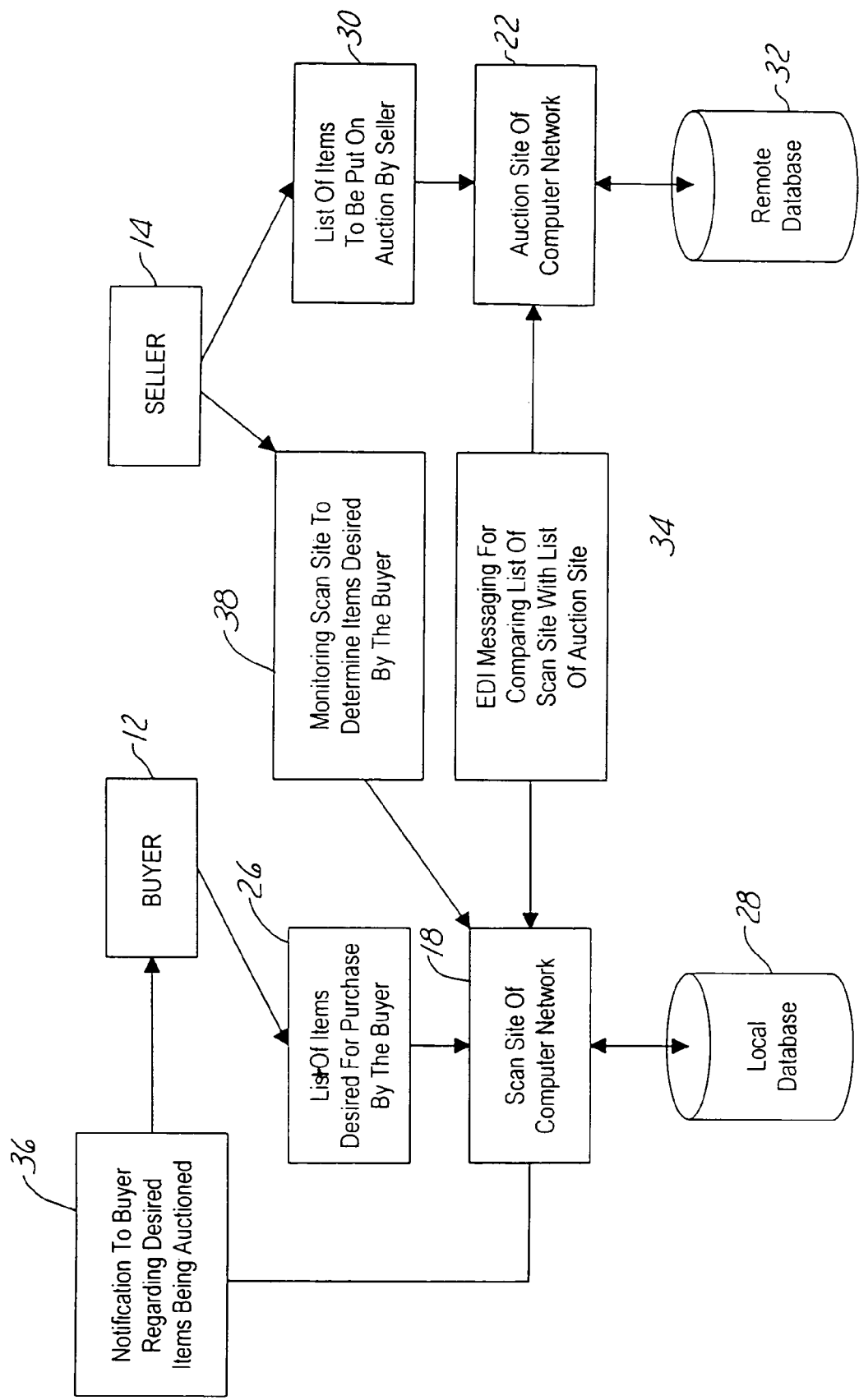
FIG. 2 illustrates a block diagram describing operation and the interfaces of the auctioning method and system in accordance with the present invention.
Figures 3A, 3B:
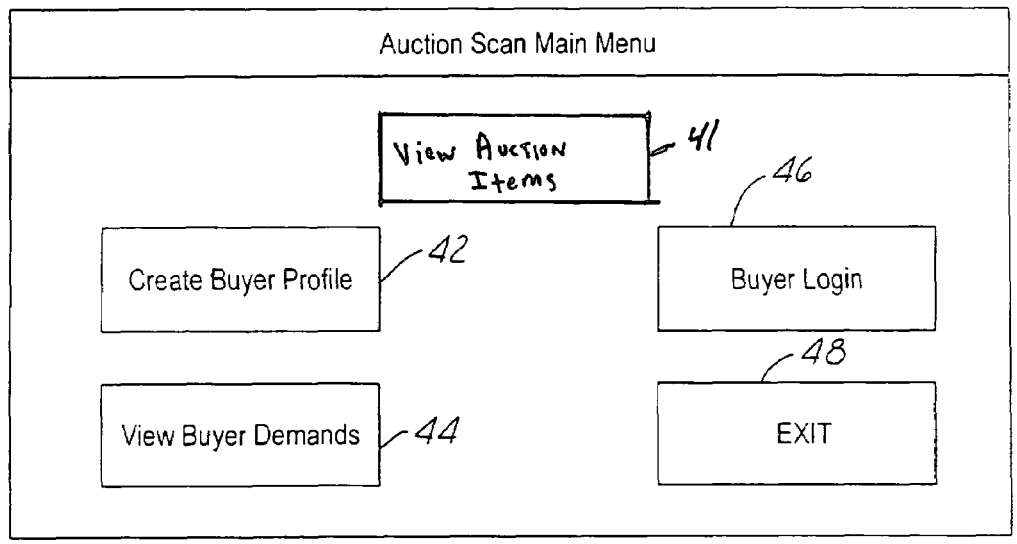
Figure 3E:
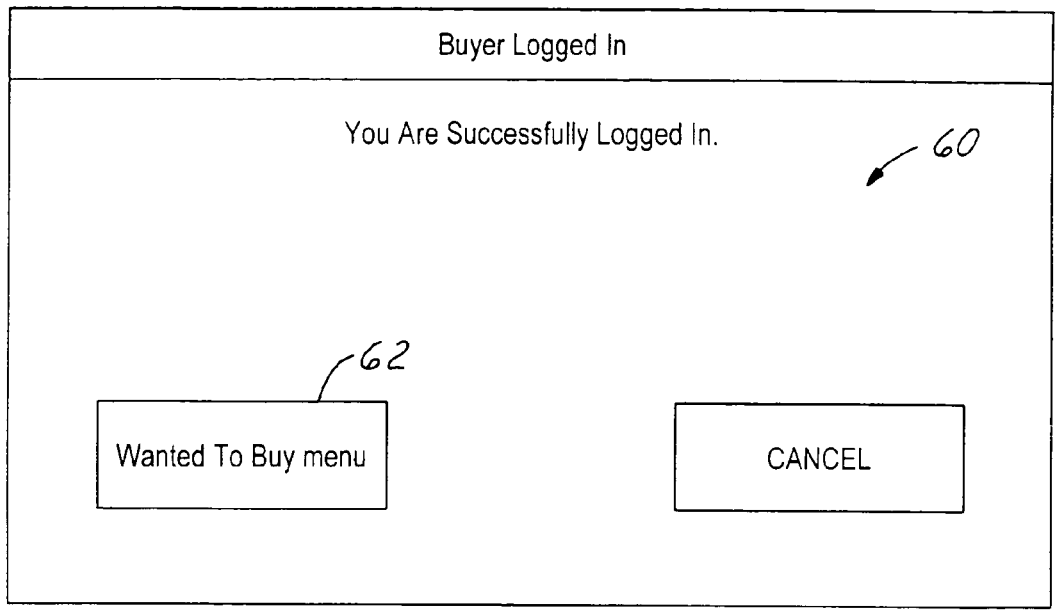
Figure 3F:
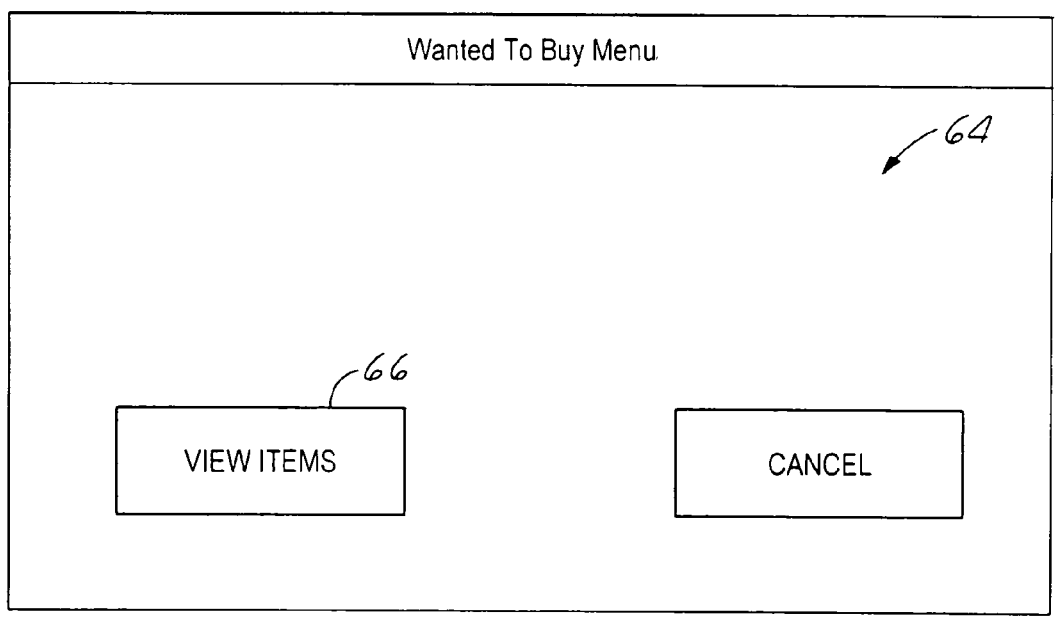
Figures 3K, 3L:
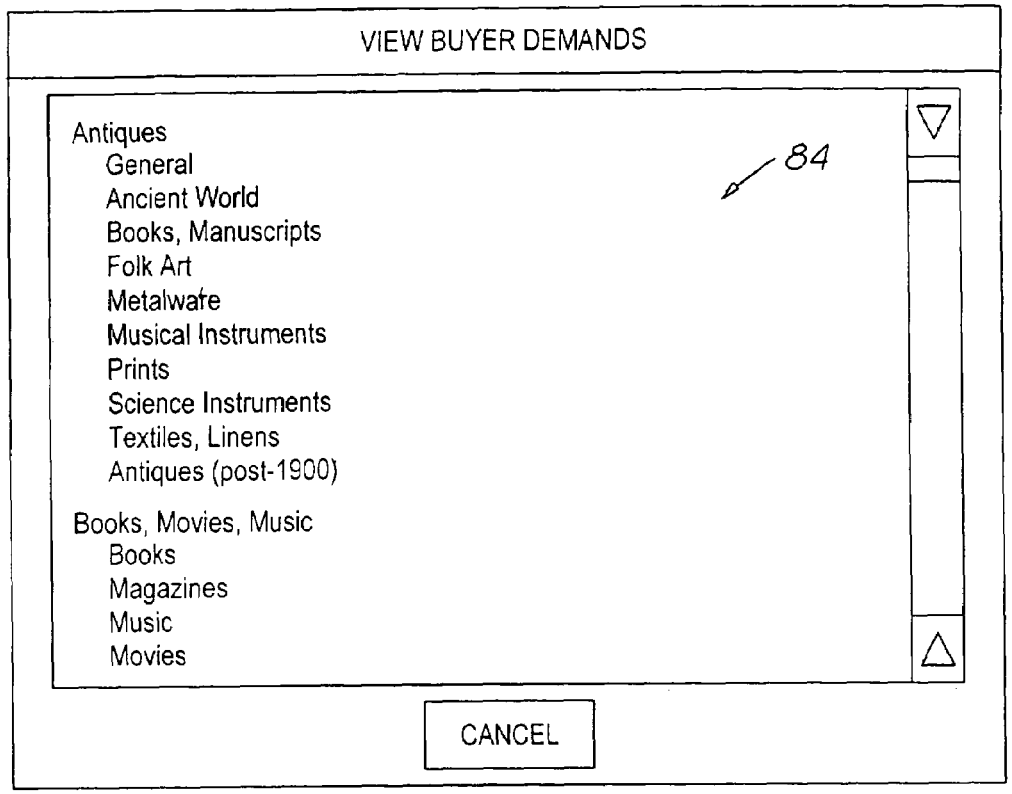

Referring now to FIG. 2, a block diagram illustrating operation and the interfaces of the auctioning method and system in accordance with the present invention is shown. Initially, a buyer 12 creates a list of products desired for purchase as shown in box 26. Buyer 12 identifies a desired product by defining parameters of the desired product. The parameters include product category, make, model, year, version, description, requested quantity, and the like. For instance, the product categories supported by scan site 18 may include all of the different product categories of the leading Internet auctioning sites thereby having the most comprehensive list of product category choices for defining a product. For example, product categories for coins & stamps may include coins, exonumia, stamps, and philately. Product categories for sports memorabilia may include autographs, memorabilia, and trading cards. The list of desired products is then entered into a scan site 18 associated with the computer network. The list of desired products is stored on a local database 28 associated with the computer network.

Seller 14 creates a list of products desired to be auctioned for sale as shown in box 30. Seller 14 identifies products to be auctioned by defining parameters of the auctioned products. The list of products to be auctioned is then entered into an auction site 22 associated with the computer network. The list of products to be auctioned is stored on a remote database 32 associated with the computer network.

In operation, scan site 18 monitors auction site 22 to compare the lists of products desired by buyer 12 with the list of products being auctioned by seller 14. Auction site 22 may include a plurality of auction sites and may also be running in the same site as scan site 18. The lists are compared by comparing desired product parameters or identifiers in scan site 18 with auctioned product parameters or identifiers in auction site 22. Scan site 18 determines from the comparison between the list of desired products and the list of products to be auctioned whether the product desired by buyer 12 are being auctioned for sale by seller 14.

Scan site 18 monitors auction site 22 using electronic data interchange (EDI) messaging as indicated in box 34. Scan site 18 uses EDI messaging to determine when desired products are being auctioned by identifying closely matched products. Products are identified as being closely matched based on a comparison of the parameters such as category, description, and the like. Scan site 18 automatically monitors auction site 22 and other auction sites. This relieves buyer 12 from manually having to scan the auction sites to determine if desired products are being auctioned for sale. Scan site 18 is operable for buyer 12 to enter a period of time in which the buyer would like the scan site to monitor the auction sites.

Upon identifying closely matched products, buyer 12 is notified that a desired product is being auctioned for sale on an auction site by a seller. Scan site 18 may notify buyer 12 as indicated in box 36 using electronic mail. The notification message may include the description of the product being auctioned, the name of the auction site which lists the product, the current bid for the product, and the like. Scan site 18 is operable with auction site 22 for enabling buyer 12 to place a bid for the product after notifying the buyer of its availability. Scan site 18 is also operable for removing the desired product from the list in the scan site in response to buyer 12 being notified that the product desired by the buyer is for sale on the auction site by seller 14.

Auction site 22 may also be operable using the EDI messaging to monitor scan site 18 to determine which products are desired to be purchased by buyer 12. Auction site 22 may then notify seller 14 upon determining a product desired for purchase with a product desired to be auctioned. Seller 14 may also directly monitor scan site 18 to determine which products are desired to be purchased by buyer 12 as shown in box 38.

The auctioning method and system of the present invention will now be described with more specific examples in the context of graphical user interface (GUI) screens. Referring now to FIGS. 3A through 3M, details of an implementation of the auctioning method and system are shown through GUI screens. Only two sample GUI screens for two categories of interest are shown for illustrative purposes. Namely, computers and barber shop categories. As may be appreciated, one may create a more robust application containing a number of GUI screens for multiple categories.

Main menu GUI screen 40 initially appears on the scan site of the computer network for the buyer to access. Main menu screen 40 includes the following choices for the buyer: create buyer profile 42, view buyer demands 44, buyer login 46, and exit 48. Create buyer profile GUI screen 50 appears upon the buyer selecting create buyer profile 42 in main menu screen 40. Create buyer profile screen 50 contains information areas for a buyer to enter to identify the buyer. The information areas include the buyer's name, login ID, email address, password, and outbid notification. After the buyer fills in the information areas the buyer may select submit button 52 to create a buyer profile in the scan site. The scan site uses the buyer profile to identify the buyer. If the information areas are filled correctly and the buyer's profile is successfully created in the auctioning system then create buyer profile created GUI screen 54 is displayed on the buyer's computer terminal.

Buyer logon GUI screen 56 appears upon the buyer selecting buyer login 46 in main menu screen 40. Buyer login screen 56 includes login ID and password information areas for the buyer to enter information. Upon entering the proper information and selecting submit button 58 buyer logged in GUI screen 60 is displayed on the buyer's computer terminal. Buyer logged in screen 60 includes a wanted to buy menu button 62. Wanted to buy menu GUI screen 64 is displayed when the buyer selects wanted to buy menu button 62 of buyer logged in screen 60. Wanted to buy menu screen 64 includes a view items button 66.

View items GUI screen 68 is displayed upon the buyer selecting view auction items button 41 in main menu screen 40 or view items button 66 in wanted to buy menu screen 64. View items screen 68 includes add item button 70, change item button 72, and delete item button 74. View items screen 68 further includes a grid 76 having a plurality of rows and columns. Each of the columns describes a parameter of a product. Products may be associated with one or more parameters but need not be associated with all of the parameters. The parameters listed in the titles of the columns include buyer item #, category, make, model, version/ISBN, year, quantity, and description. The buyer fills in information in the rows of grid 76 for each desired product. A database stores the information in grid 76.

To add information for a new desired product the buyer selects add item button 70. The buyer may select an item listed in a given row by simply highlighting the row and then selecting change item button 72 or delete item button 74. If the buyer selects change item button 72 the information relating to the product can be changed via another screen. If the buyer selects delete item button 74 the information relating to the selected product will be deleted from grid 76.

Add item GUI screen 78 appears upon the buyer selecting add item button 70 of view items screen 68. Add item screen 78 includes a list of scrollable categories. Each category is a hyper-text link that the buyer can select to add details of the desired product. Add item—computers GUI screen 80 appears upon the buyer selecting the computers hyper-text link category in add item screen 78. Depending on the category of the product selected for addition, the contents of add item screen 80 will vary. Upon addition of the product to the wanted to buy list a buyer item number will automatically be generated in view items screen 68. Similarly, add item—barber shop screen 82 appears upon the buyer selecting the barber shop hyper-text link category in add item screen 78.

View buyer demands GUI screen 84 appears when the seller (or buyer) selects view buyer demands button 44 in main menu screen 40. View buyer demands screen 84 shows the seller a list of scrollable categories. As before, each category is a hyper-text link that the seller can select to add details of the products that the seller may be interested in auctioning after gauging buyer demand.

View buyer demands—computers GUI screen 86 appears when the seller selects the computers hyper-text link category in view buyer demands screen 84. In screen 86, if the seller has a corresponding product that the seller would like to sell then the seller may do so by simply selecting the row(s) that apply to the product being sold and then click auction item button 88 to fill out the details in grid 88 of the product to be auctioned. As before, not all attributes for each product need to be present in grid 88 because the attributes depend on the category of the product.

Auction item—computers GUI screen 90 is displayed when the seller selects auction item button 88 of view buyer demands screen 86. The contents of auction item screen 90 varies depending upon the category of the product being auctioned. It is assumed that the seller's profile has already been created in which the seller inputs credit card information. In auction item screen 90 the seller may or may not be placing the product to be auctioned in response to the demands of the buyers. If the product is auctioned in response to the demands of the buyers then the field "buyer item #s" will be populated from the selection made from view buyer demands—computers screen 86. Otherwise, this field will be left blank. However, when the seller adds an item for auction a "seller item #" will automatically be created.

As described with reference to FIG. 2, scan site 18 sends an email message to the buyer when the scan site finds a closely matched product in one of the auction sites 22. Generally, upon receipt of the email message, the buyer, if interested in bidding the desired product, may reply to the email message. Alternatively, the buyer may enter a web page of scan site 18 and enter to bid for the desired product by inputting the item # indicated in the email.

The email message sent to the buyer from scan site 18 contains an HTML file as an attachment. The contents of the HTML file include one or more of the following: type of email message (such as "Matching item found. Are you ready to bid now?", "You have been outbid by another customer. Do you want to increase your bid?", or "You have won the bid."), buyer item #, category, requested make, requested model, requested year, requested version/ISBN, requested description, requested quantity, auction site selling item, seller item #, make of the merchandise being auctioned, model of the merchandise being auctioned, year of the merchandise being auctioned, version/ISBN of the merchandise being auctioned, quantity of the merchandise being auctioned, description of the merchandise being auctioned, bid starts at $, latest bidding price (if outbid), seller ID, end date of auction, picture of the merchandise (if any) being auctioned, number of bids, and your new bid price (applies as an input only in the case of being outbid).

At the end of the HTML file there are three buttons labeled "Assent", "Dissent", and "No longer interested." If the "Assent" button is selected then the buyer will become an active participant in the bidding process. If the "Dissent" button in selected then the buyer will not be entered in the bidding process. If the "No longer interested" button is selected then the corresponding product will be removed from both the bidding process (if already entered into the bidding war) and the "Wanted to Buy" list of the buyer.

Referring now to FIGS. 4A through 4D, the database layouts maintained by scan site 18 in order to process the wanted to buy products on a per buyer and a per seller basis will be described. In general, the database layouts store information regarding the products requested by the buyer and those auctioned by the seller. Different views of the database layouts can be presented in order to assist sellers in viewing the demands for various categories. The database layouts include a wanted to buy table 92 as shown in FIG. 4A, a merchandise auctioned table 94 as shown in FIG. 4B, a buy sell items link table 96, and a bid decision table 98. The keys to tables 92 and 94 are the "buyer item #" and the "seller item #" columns. These columns are numeric fields generated automatically whenever a potential buyer adds a product to the wanted to buy list and a seller lists a product for sale either as a response to viewing the wanted to buy list (see buy sell items link table 96) or as an initiative to sell the item on the seller's own accord.

Referring now to FIG. 2, the details of the EDI messaging as performed by box 34 between scan site 18 and auction site 22 will now be described in greater detail. Scan site 18 and auction site 22 exchange messages via an available EDI engine. It is assumed that scan site 18 is running in a different site from auction site 22 where the sellers have listed their products for sale without regard to buyer demands or checking with the scan site for the demands as indicated by the wanted to buy lists of buyers.

Scan site 18 prepares a "match request" EDI message for each product located in the wanted to buy table 92 that does not have a "match found". The match request message is sent on a periodic basis such as every night to all of the auction sites that the scan site interfaces. The contents of the match request message will be as follows: buyer item #, category, make, model, year, quantity, version/ISBN, and description.

Auction site 22 employs pattern matching techniques to find a close match for each of the products in the request message and will periodically send a "match response" EDI message to scan site 18. The match response message contains the following elements listed below (the elements are repeated for each product sent in the request message). If a match is found then scan site will send an email message to the buyer as described above. The contents of the match response message include buyer item #; name of the auction site selling product; seller item #, make, model, year, version/ISBN, description, quantity of the merchandise being auctioned; bid starts at $; latest bidding price; seller ID; end date of auction; picture of the merchandise; and number of bids.

The matching buyer item # and seller item # are used in other EDI messages. These EDI messages include a "Start Bid Process" message, an "Outbid Notification" message, an "Outbid Response" message, a "Remove Buyer" message, a "You have won the Bid" message, a "List Auction Items Request" message, a "List Auction Items Response" message, a "Seller ID inquiry" message, and a "Seller ID Response" message.

Scan site 18 sends a start bid process EDI message to auction site 22 whenever a buyer assents to the bidding as a response to the email sent. The contents of the message include buyer item #, seller item #, and bid starts at $. Scan site 18 sends an outbid notification EDI message to buyer 12 whenever another buyer outbids the buyer. The contents of outbid notification EDI message are as follows: buyer item #; name of the auction site selling product; seller item #, make, model, year, version/ISBN, description, quantity of the merchandise being auctioned; bid starts at $; latest bidding price (if being outbid); seller ID; end date of auction; picture of the merchandise; and number of bids.

Scan site 18 sends an outbid response EDI message to auction site 22 whenever the buyer increases the bidding price after receiving an email notification about being outbid. The contents of the outbid response EDI message include buyer item #, seller item #, and new bidding price. Scan site 18 sends a remove bidder EDI message to auction site 22 whenever the buyer withdraws from the bidding process. The contents of the remove bidder message include buyer item # and seller item#.

Scan site 18 sends a you have won the bid EDI message to the buyer whenever auction site 22 determines that the buyer is the winner of the bidding process. The contents of this message include buyer item #; name of the auction site selling product; seller item #, make, model, year, version/ISBN, description, quantity of the merchandise being auctioned; bid starts at $; latest bidding price; seller ID; end date of auction; picture of the merchandise; and number of bids.

Scan site 18 sends a list auction items EDI message for each product listed by the seller in the auction sites. The list auction items message will be sent periodically to each of the auction sites that the seller wants to advertise the products for sale. The contents of the list auction items message include seller item #, seller ID, auction site, category, make, model, year, quantity, version/ISBN, description, picture, bid starts at $, and end date.

Scan site 18 sends a seller ID inquiry EDI message to auction site 22 whenever scan site 18 determines that the buyer account belonging to itself is the winner of the bidding process. The seller ID inquiry message includes the seller ID. Auction site 22 sends a seller ID response EDI message to scan site 18 in response to a seller ID inquiry message. The contents of the seller ID response message include seller ID, seller's email address, and seller's phone number.

Referring still to FIG. 2, the details in which scan site 18 and auction site 22 exchanges message with their respective database 28 and database 32 and execute the transactions as a standalone system where buyers and sellers come together in order to make use of the functionality of the present invention will now be described. Initially, it is to be appreciated that a buyer may create a wanted to buy list in an auction site instead of in a scan site.

A seller can advertise products to be auctioned in two ways. One way is to create the list of products in scan site 18 and the other way in auction site 22. Details of messages exchanged between scan site 18 and local database 28 when the seller creates the list of products for sale in the scan site will now be described. Scan site 18 will send periodically a "Match Request" query to local database 28 for each product found in wanted to buy table 92 that does not have a match found. The contents of the message include the various product identifiers shown in FIG. 3L.

Local database 28 employs pattern matching techniques to find a close match for the products in the request message and will periodically send a match response message to scan site 18. The match response message includes the same information described above with reference to a match response message from auction site 22. If a match is found then scan site 18 sends an email message to the buyer to notify of same.

Scan site 18 sends a start bid process message to local database 28 whenever a buyer assents to the bidding as a response to the email notification. Local database 28 then sends an outbid notification message to scan site 18 for the buyer whenever another customer outbids the buyer. The contents of this message include the same information described above with reference to an outbid notification message from auction site 22.

Scan site 18 sends an outbid response message from the buyer to local database 28 whenever the buyer increase the bidding price. Scan site 18 sends a remove bidder message to local database 28 whenever the buyer withdraws from the bidding process. Local database 28 removes the matching "buyer item #" rows from bid decision table 98 as well as from the wanted to buy table 92. Local database 28 sends a "You have won the bid" message to scan site 18 whenever the local database determines that the buyer is the winner of the bidding process. The contents of this message include the same information as the "You have won the bid" message from auction site 22.

Thus, it is apparent that there has been provided, in accordance with the present invention, a method and system for auctioning a product on a computer network having an auction site and a scan site that fully satisfy the objects, aims, and advantages set forth above. While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A method of auctioning products on a computer network the method comprising:
    placing a first sale product identifier indicative of a first product for sale by a first seller on a first auction site which is hosted on the computer network by a first auction site host for a first auctioneer;
    placing a second sale product identifier indicative of a second product for sale by a second seller on a second auction site which is hosted on the computer network by a second auction site host for a second auctioneer;
    placing a desired product identifier indicative of a product desired by a buyer on a scan site which is hosted on the computer network by a scan site host for a third auctioneer;
    monitoring the auction sites with the scan site using electronic data interchange messaging in order to compare
    the desired product identifier on the scan site with the sale product identifiers on the auction sites;
    determining from the comparison between the desired product identifier and the sale product identifiers whether the product desired by the buyer is for sale on any of the auction sites by any of the sellers;
    monitoring the scan site with the auction sites using electronic data interchange messaging to compare the sale product identifiers on the auction sites with the desired product identifier placed on the scan site in order to enable the sellers to determine the products for sale that are desired by the buyers.

2. The method of claim 1 further comprising:
    notifying the buyer when the product desired by the buyer is for sale on an auction site by a seller.

3. The method of claim 2 wherein:
    notifying the buyer includes notifying the buyer using electronic mail.

4. The method of claim 1 wherein:
    each of the product identifiers includes a category product identifier, wherein comparing the desired product identifier with the sale product identifiers includes comparing the category product identifier on the scan site with the category product identifiers on the auction sites.

5. The method of claim 1 wherein:
    each of the product identifiers includes a description product identifier, wherein comparing the desired product identifier with the sale product identifiers includes comparing the description product identifier on the scan site with the description product identifiers on the auction sites.

6. The method of claim 2 further comprising:
    placing a bid from the buyer to an auction site for the product desired by the buyer.

7. The method of claim 2 further comprising:
    removing the desired product identifier from the scan site in response to the buyer being notified that the product desired by the buyer is for sale on an auction site by a seller.

8. A computer network auctioning system comprising:
    a first auction host computer hosting a first auction site on a computer network for a first auctioneer, wherein the first auction site has a first sale product identifier indicative of a first product for sale by a first seller;
    a second auction host computer hosting a second auction site on the computer network for a second auctioneer, wherein the second auction site has a second sale product identifier indicative of a second product for sale by a second seller; and
    a scan host computer hosting a scan site on the computer network for a third auctioneer, wherein the scan site has a desired product identifier indicative of a product desired by a buyer, wherein the scan host computer monitors the auction sites using electronic data interchange messaging in order to compare the desired product identifier on the scan site with the sale product identifiers on the auction sites and then determines from the comparison between the desired product identifier and the sale product identifiers whether the product desired by the buyer is for sale on any of the auction sites by any of the sellers;
    where in the auction host computers monitor the scan site using electronic data interchange messaging to compare the sale product identifiers on the auction host computers with the desired product identifier placed on the scan host computer in order to enable the sellers to determine the products for sale that are desired by the buyers.

9. The system of claim 8 wherein:
    the scan host computer is further operable to notify the buyer when the product desired by the buyer is for sale on an auction site by a seller.

10. The system of claim 9 wherein:
    the scan host computer notifies the buyer using electronic mail.

11. The system of claim 9 wherein:
    the scan host computer is operable for placing a bid from the buyer to an auction site for the product desired by the buyer.

12. The system of claim 9 wherein:
    the scan host computer is operable for removing the desired product identifier from the scan site in response to the buyer being notified that the product desired by the buyer is for sale on an auction site by a seller.

13. The system of claim 8 wherein:
    each of the product identifiers includes a category product identifier, wherein the scan host computer compares the category product identifier on the scan site with the category product identifiers on the auction sites.

14. The system of claim 8 wherein:
    each of the product identifiers includes a description product identifier, wherein the scan host computer compares the description product identifier on the scan site with the description product identifiers on the auction sites.

15. A method of auctioning merchandise on a computer network, the method comprising:
    placing sale identifiers indicative of merchandise for sale by sellers on auction sites hosted by respective auction site hosts on the computer network for respective auctioneers;
    placing desired identifiers indicative of merchandise desired by buyers on a scan site hosted on the computer network by a scan site host for another auctioneer;
    monitoring the auction sites with the scan site using electronic data interchange messaging in order to compare
    the desired identifiers on the scan sites with the sale identifiers on the auction sites;
    determining from the comparison between the desired identifiers and the sale identifiers whether merchandise desired by the buyers is for sale on the auction sites by the sellers; and
    monitoring the scan site with the auction sites using electronic data interchange messaging to compare the sale product identifiers on the auction sites with the desired product identifier placed on the scan site in order to enable the sellers to determine the products for sale that are desired by the buyers.

16. The method of claim 15 further comprising:

notifying buyers which auction sites the sellers are selling the merchandise desired by the buyers when the merchandise desired by the buyers are for sale on the auction sites by the sellers.

17. The method of claim 16 further comprising:

notifying the buyers of the current bid of the merchandise desired by the buyers for sale on the auction sites by the sellers.

\* \* \* \* \*